(No Model.)
W. SANFORD.
Buckboard Wagon.
No. 232,765.  Patented Sept. 28, 1880.
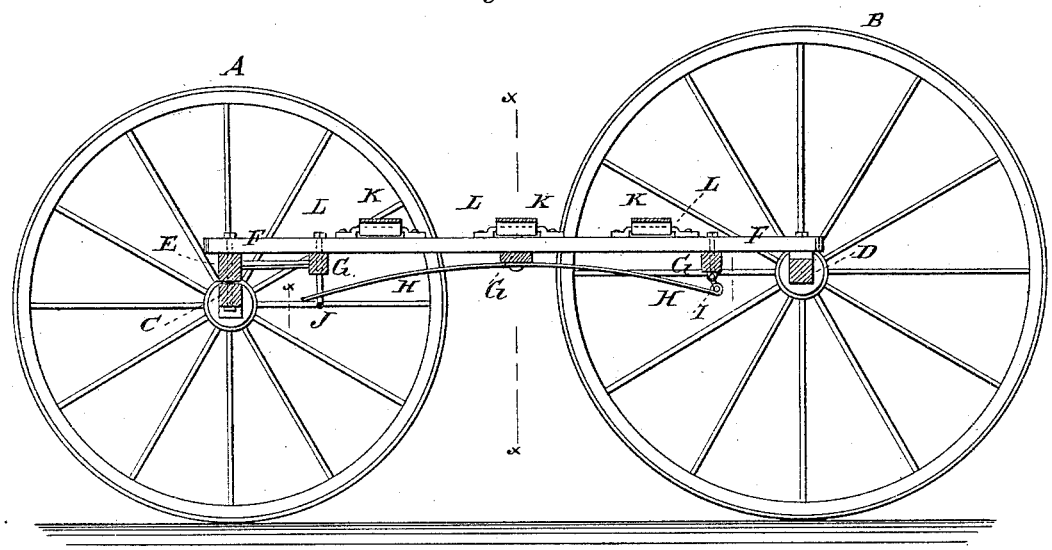
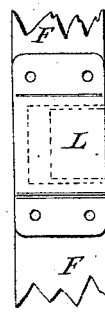
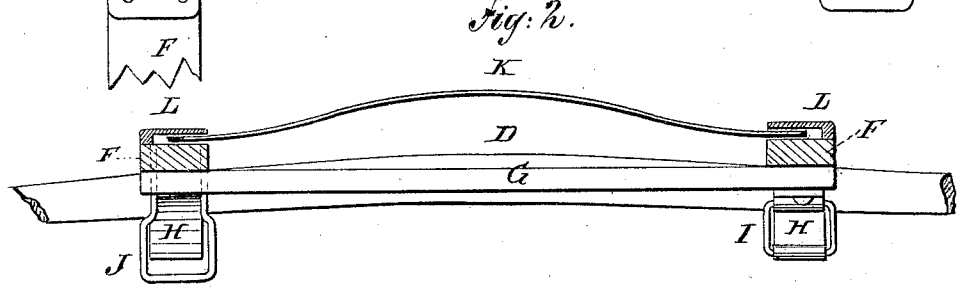
WITNESSES:
Chas. Nida
C. Sedgwick
INVENTOR:
W. Sanford
BY Munn & Co.
ATTORNEYS.

UNITED STATES PATENT OFFICE.

WILLIAM SANFORD, OF COHOES, NEW YORK.

BUCKBOARD-WAGON.

SPECIFICATION forming part of Letters Patent No. 232,765, dated September 28, 1880.

Application filed July 19, 1880. (No model.)

*To all whom it may concern:*

Be it known that I, WILLIAM SANFORD, of Cohoes, in the county of Albany and State of New York, have invented a new and useful Improvement in Buckboard-Wagons, of which the following is a specification.

Figure 1 is a sectional side elevation of the improvement. Fig. 2 is a sectional end elevation taken through the line $x\ x$, Fig. 1. Fig. 3 is a plan view of one of the cap-plates. Fig. 4 is an under-side view of one of the cap-plates.

Similar letters of reference indicate corresponding parts.

The object of this invention is to furnish buckboard-wagons so constructed that they will be more elastic and at the same time stronger than when constructed in the usual manner.

The invention consists in combining with the buckboards of curved longitudinal springs placed beneath the buckboards and curved cross-springs connected at their ends with the buckboards by cap-plates, whereby the strength and elasticity of the wagon will be increased, as will be hereinafter fully described.

A represents the forward wheels; B, the rear wheels; C, the forward axle; D, the rear axle; E, the forward bolster, and F the side bars or buckboards, all of which parts are constructed in the ordinary manner.

To the under side of the buckboards F, at their centers, and equally distant from their centers toward each end, are attached three cross-bars, G.

To the central cross-bar, G, and the centers of the buckboards F, are attached the centers of the curved or half-elliptic springs H, the ends of which are connected with the end cross-bars, G, and the end parts of the buckboards F by shackles I, as shown at the right-hand end of the spring in Fig. 1, by loops J, as shown at the left-hand end of the spring in Fig. 1, or by cap-plates or sockets, as shown with reference to the cross-springs in Figs. 2, 3, and 4.

With this construction, when the load is light, it will be supported entirely by the buckboards F; but when the load is heavy the buckboards will be re-enforced by the springs H, so that the wagon will ride easy both when carrying a light load and when carrying a heavy load.

K are curved or half-elliptic cross-springs, the ends of which rest upon the buckboards F, and are kept in place by caps or sockets L, attached to the upper sides of the said buckboards F. The cap-plates L thus keep the ends of the springs K in place and allow them to slide outward when the said springs are lengthened by pressure.

The flat-bottomed body is secured to cross-bars, which are attached centrally to the middle of cross-springs.

Having thus fully described my invention, I claim as new and desire to secure by Letters Patent—

In a buckboard-wagon, the combination, with the buckboards F, of the longitudinal curved springs H, placed beneath the buckboards, and the curved cross-springs K, connected with the buckboards by the cap-plates L, substantially as herein shown and described.

WILLIAM SANFORD.

Witnesses:
   JAMES T. GRAHAM,
   C. SEDGWICK.